March 14, 1944. O. STEINER 2,344,472
PHOTOGRAPHIC FLASH SYNCHRONIZER EQUIPMENT
Filed Nov. 14, 1942 3 Sheets-Sheet 1
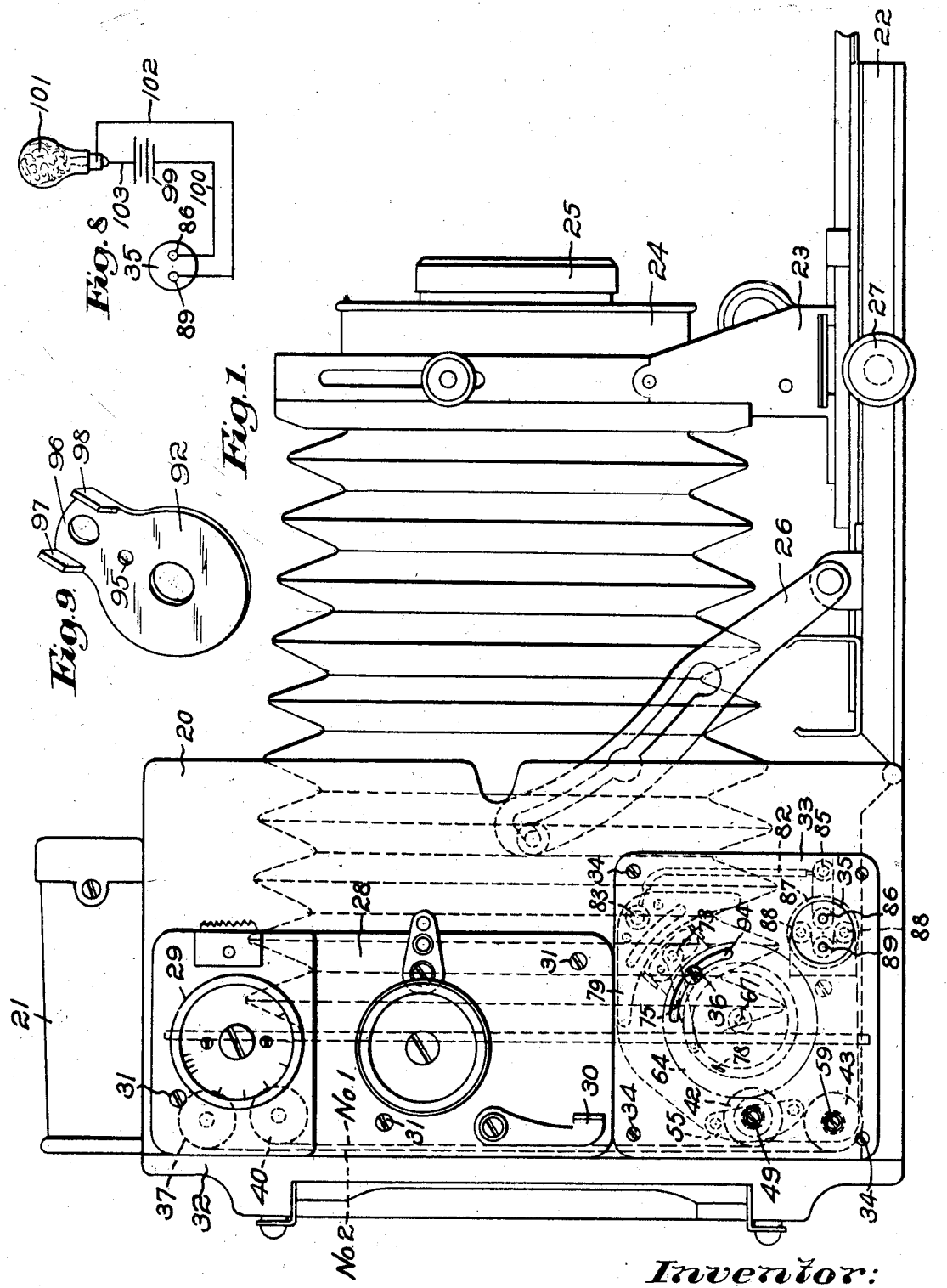
Inventor:
Oscar Steiner,
by Emery, Booth, Townsend, Neill and Whidden
Attys March 14, 1944. O. STEINER 2,344,472
PHOTOGRAPHIC FLASH SYNCHRONIZER EQUIPMENT
Filed Nov. 14, 1942 3 Sheets-Sheet 2
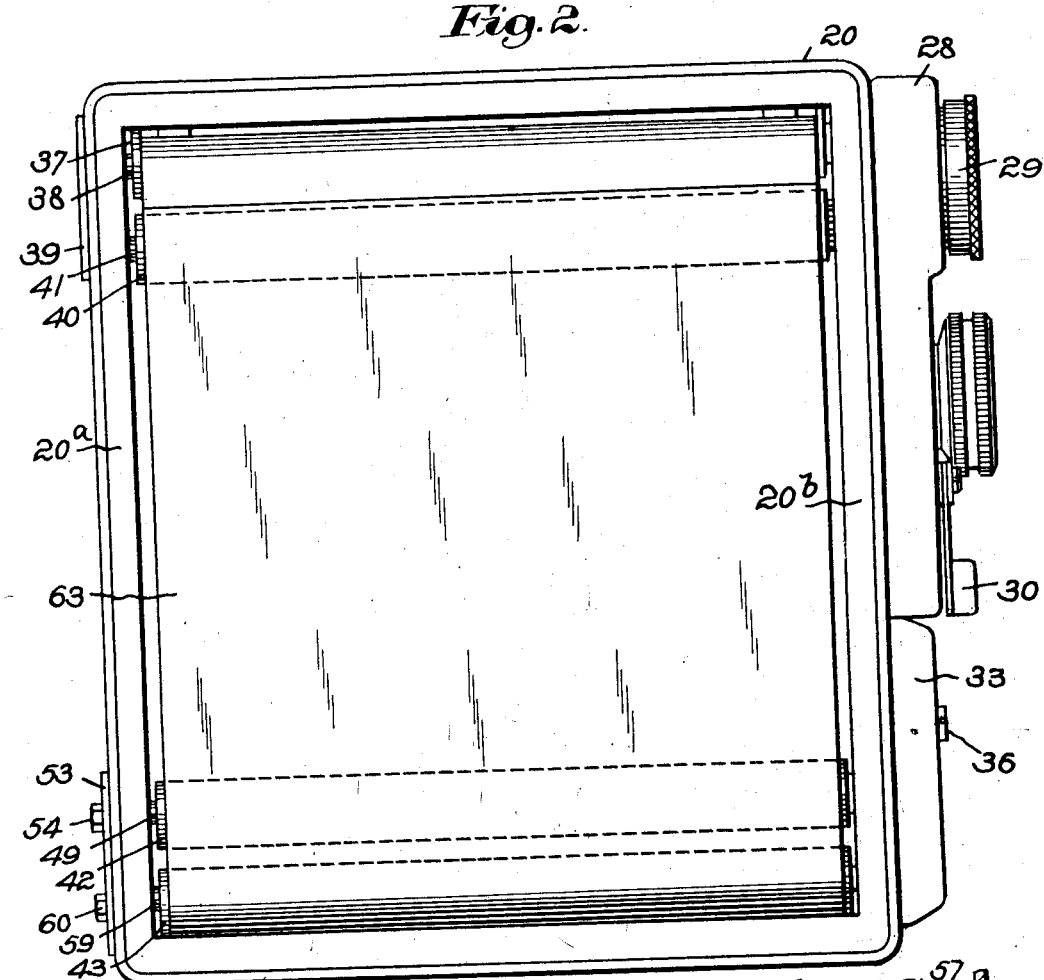
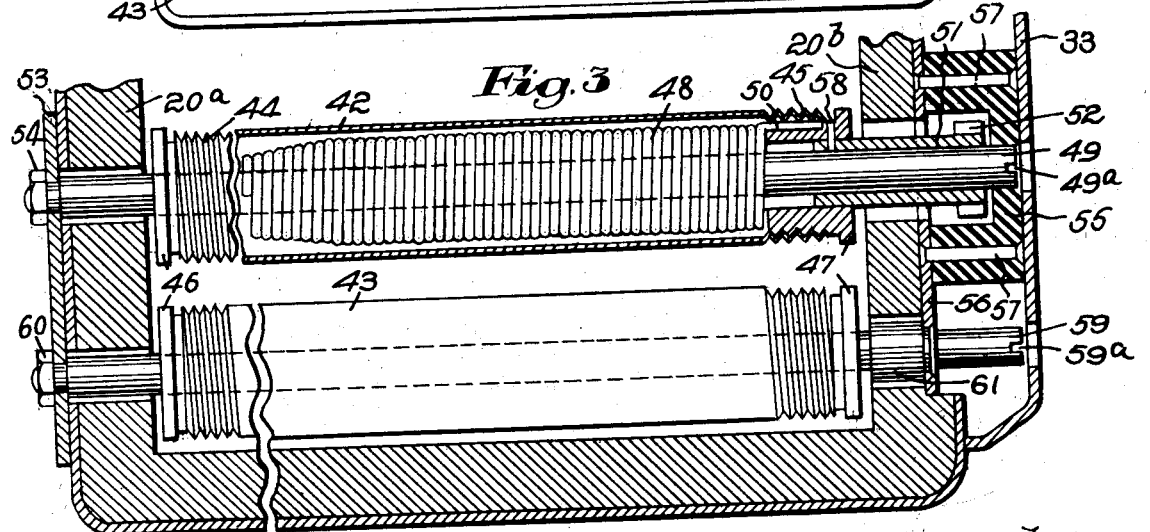
Inventor:
Oscar Steiner,

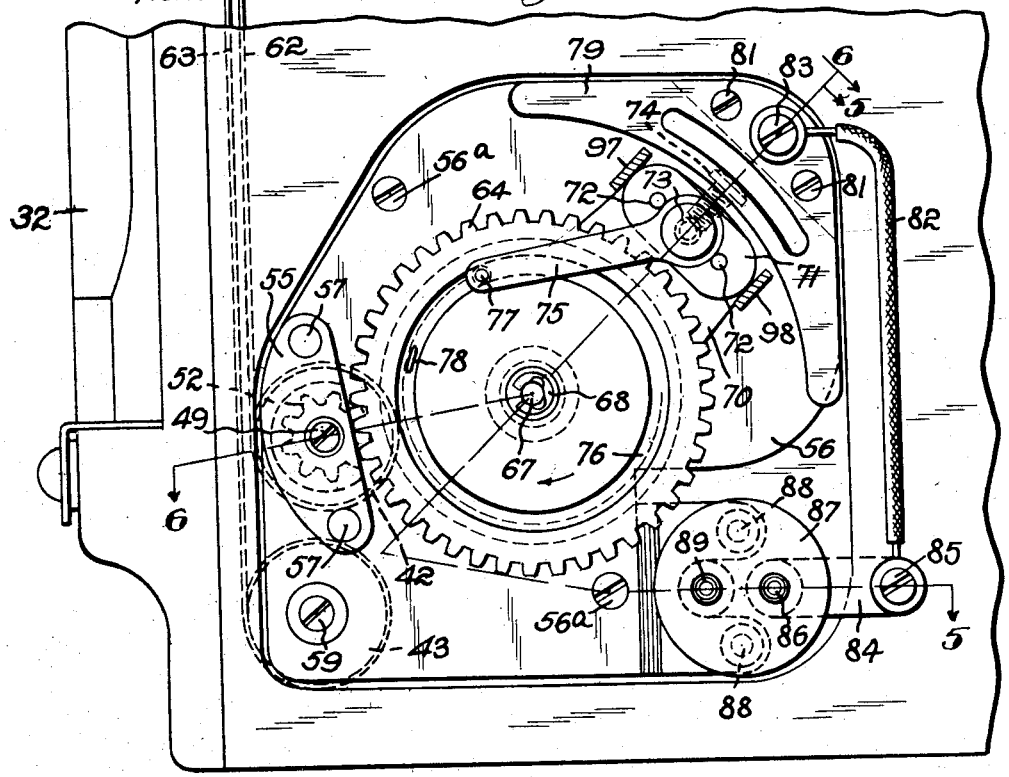
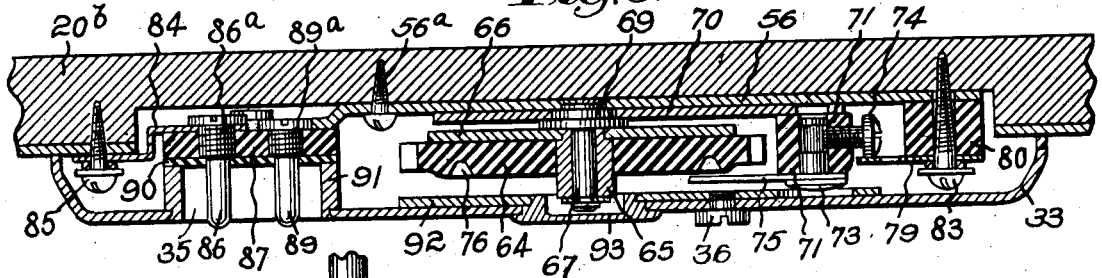
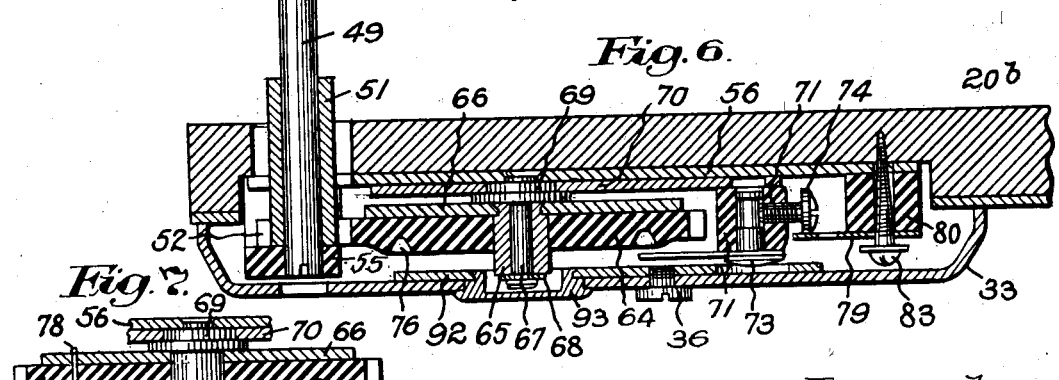

Patented Mar. 14, 1944

2,344,472

UNITED STATES PATENT OFFICE 2,344,472

PHOTOGRAPHIC FLASH SYNCHRONIZER EQUIPMENT

Oscar Steiner, Rochester, N. Y., assignor to The Folmer Graflex Corporation, Rochester, N. Y., a corporation of Delaware Application November 14, 1942, Serial No. 465,559

2 Claims. (Cl. 67—29)

This invention, as to one aspect thereof, is subsidiary to and is comprehended within the broadly claimed scope of the invention disclosed in my co-pending application Ser. No. 445,702, filed June 4, 1942, now Patent No. 2,304,035, dated December 1, 1942, the present invention being directed to matter not specifically described or illustrated in said patent, namely, a focal-plane shutter consisting of two curtains having a variable exposure slot or aperture however constituted, means for effecting synchronization of the flash of a photoflash lamp with the action of such two-curtain focal-plan shutter, and means for controlling such synchronization from a take-up tension roller of such two-curtain focal-plane shutter. In another aspect thereof this invention is directed broadly, and for the first time in the art, to the synchronization with the flash of a photoflash lamp of a focal-plane shutter consisting of two curtains.

This invention therefore relates to a new photographic flash synchronizer equipment particularly adapted for use with focal plane shutters of the two-curtain type.

In order that the principle of the invention may be readily understood, I have disclosed a single embodiment thereof in the accompanying drawings, wherein Fig. 1 is a side elevation of a photographic camera having a focal plane shutter of the two-curtain type, the camera having attached thereto a synchronizer mechanism in accordance with my invention;

Fig. 2 is a rear elevation of Fig. 1 with the camera back removed to show the position of the focal plane shutter and the respective shutter curtain rollers thereof;

Fig. 3 is a fragmentary section through the camera, taken on the center line of the two shutter-curtain take-up tension rollers;

Fig. 4 is a fragmentary detail in elevation, on an enlarged scale, showing the position of the several parts that constitute the synchronizing equipment;

Fig. 5 is a section through Fig. 4 on the line 5—5 thereof;

Fig. 6 is a section through Fig. 4 on the line 6—6 thereof;

Fig. 7 is a transverse section through the contact gear and contact member;

Fig. 8 is a circuit diagram showing the electrical circuit of the synchronizer, battery and flash lamp; and Fig. 9 is an isometric detail of the synchronizer adjusting plate.

There have been many synchronizers developed for use with focal plane shutters of the multiple aperture type, but so far as I know there has been no synchronizer especially adapted to work with focal plane shutters having two curtains. In such type of shutter, the position of one of the curtains is adjustable to provide an exposure slot or aperture when the two curtains are operated for making an exposure. There are several different types of these shutters, and I will briefly refer to some of them. I have elected, by way of example only, to represent my invention as applied to a two curtain shutter as used in a Speed Graphic camera and disclosed in the patent to Hineline, No. 2,242,124, May 13, 1941. In such shutter, two curtains are used, one termed the first curtain and the other the second curtain. The mechanism is such that after the shutter has been rewound and the release lever operated, the first curtain starts to travel, and after it travels a sufficient distance to form an exposure slot or aperture determined by the shutter setting, the second curtain is released, and then the first and second curtains travel together until both curtains reach the end of their travel. A shutter of similar structure is disclosed in the patent to Nuchterlein, No. 2,180,064, November 14, 1939, and the operation of the two curtains during exposure is precisely the same. A modification of such general shutter principle is shown in the patent to Barnack, No. 1,652,553, December 13, 1927, wherein the curtain is wound up on two sheaves and a central spool, but the action of the curtains during exposure is similar to that in said Hineline and Nuchterlein patents— that is, the first curtain is released and after it has traveled sufficient distance to establish a predetermined slot or aperture, the second curtain is released and both curtains travel across the exposure slot or aperture until both curtains are stopped by their respective supply spools. In all of the said patents, the shutters are of the self-capping type—that is, when the curtains run all the way down, the second curtain overlaps the first and when the curtains are rewound, they are rewound in this condition. Another type of shutter that operates similarly is shown in the patent to Petit and Hineline, No. 1,980,546, November 13, 1934. In such type of shutter, the exposure slot or aperture is established by the setting of the shutter dial and therefore is established before the shutter is released. However, the second curtain is used to vary the slot or aperture. Therefore, in all of these several types of shutters, the first curtain always starts from the same position and the second curtain, in shutters of the self-capping type, starts at a later time depending on the exposure slot or aperture, and in the said Petit and Hineline patent the second curtain starts at the same time the first curtain starts but at a much greater distance away from the exposure opening, depending on the aperture setting.

It will be evident from the foregoing why I have elected to use the so-called first curtain for controlling the synchronizer of the present invention.

Among the objects of this invention is: to provide a synchronizer for synchronizing focal-plane shutters of the two-curtain type; to provide a synchronizer for focal plane shutters of the two-curtain type having adjustments for timing, wholly independent of the shutter operating mechanism; to provide a synchronizer for focal plane shutters of the two-curtain type wherein I can provide greater latitude of adjustment to accommodate flashlamps of many different types due to the conjoint result of the selective adjustment of the size of the opening of the camera and the adjustment of one of electrical contacts of the synchronizer circuit; and to provide a synchronizer for focal plane shutters of the two-curtain type that is well adapted to make the so-called open-and-shut flash shots using the duration of light of the flash bulb for timing the exposures.

Referring first to the general structure of the camera as shown in Fig. 1, the camera box or casing is represented at 20, it having a left hand wall 20a, shown in Figs. 3 and 4, and a right hand wall 20b shown in Figs. 3, 5 and 6. To the said box or casing, preferably at the top thereof, is attached the usual view finder 21, and it is also provided with the usual bed 22 and the camera front member 23 carrying a shutter 24 and a lens 25. There is provided the usual camera bed brace 26 and focusing knob 27, and attached to one wall of the camera box or casing 20 is a shutter housing or plate 28 having a shutter rewind knob 29 and a shutter release member 30. The shutter housing or plate 28 has other controls, but as they form no part of the present invention, it is unnecessary to refer to them. It is attached to the camera box or casing 20 by screws 31, 31, and the camera is equipped with the usual back member 32. To the lower left hand corner of the camera box or casing 20 viewing Fig. 1, there is attached a synchronizer plate, cover or housing 33 by means of screws 34, 34, and fitted thereinto is suitable receptive means indicated at 35 for plugging in the wires of the electric circuit hereinafter referred to, and accessible from the outside of the said synchronizer plate, cover or housing 33 is a synchronizer adjusting screw 36, the function whereof is hereinafter more fully referred to.

The two-curtain focal-plane shutter herein shown as one example or embodiment of a two-curtain focal-plane shutter synchronized by my invention with a photoflash lamp is represented particularly in Figs. 2 and 3, and in dotted lines in Fig. 1. In Figs. 2 and 3 the camera is represented as having the back thereof removed so as to disclose the two shutter curtains and their shutter curtain rollers. In the top portion of the camera box or casing 20 there is provided space for the shutter-curtain rewind rollers, the uppermost one whereof, indicated at 37, will herein be referred to as the second shutter-curtain rewind roller, it being provided with a shaft 38 running in a bearing provided in a plate 39 on the left hand side of the camera viewing Fig. 2. The said shaft 38 extends through the shutter rewind roller and terminates in a bearing (not shown) on the right hand side of the camera, being enclosed by the shutter housing 28.

Just below the said second shutter-curtain rewind roller 37 is positioned, as indicated at 40, the first curtain-shutter rewind roller, it being provided with a shaft 41 running in a bearing in the said plate 39 and extending through the said rewind roller 40 to the right hand side of the camera and terminating there in a bearing (not shown) provided therefor and enclosed by the shutter housing or plate 28.

In the bottom part of the camera box or casing 20 there is provided space for the two shutter-curtain take-up tension rollers. The upper one, indicated at 42, is herein referred to as the first-curtain take-up extension roller, and just below such roller is located the second shutter-curtain take-up roller 43, herein referred to as the second shutter-curtain take-up tension roller.

The shutter-curtain take-up tension roller 42 preferably comprises a metallic cylindrical member having threaded portions 44, 45 at the extreme ends thereof. Into the threaded portion 44 is threaded a bushing 46 and into the threaded portion 45 is threaded a bushing 47. Between said bushings is placed a coiled or helical spring 48, one end of which is attached to a through-shaft 49 and the opposite end whereof is bent over forming a horizontal extension 50 engaging a slot provided therefor in the bushing 47. One end of the coiled spring 48 is held stationary with the through-shaft 49 and the opposite end of the said coiled spring 48 is anchored to the bushing 47, which in turn is anchored to the first-curtain take-up tension roller 42. Also attached to the bushing 47 is a sleeve 51 having a pinion 52 on the outer right hand end viewing Fig. 3. The through-shaft 49 is anchored on the left hand side of the camera viewing Fig. 3 by means of a tension roller retaining plate indicated at 53 through a lock nut 54 and the opposite end of the through-shaft 49 is supported in a bearing 55 of insulating material held to the synchronizer mechanism base plate 56 by means of through-rivets 57, 57, the said base plate 56 being held to the camera wall by means of screws 56a, 56a, best shown in Fig. 4.

The first-curtain take-up tension roller 42 is free to turn on the through-shaft 49 within the limit of the coiled spring 48. As the said tension roller 42 is caused to be turned, the sleeve 51 and the pinion 52 are also turned, said sleeve 51 being attached to the bushing 47 in any suitable manner as by a press fit or by a pin indicated at 58. The said coiled spring 48 is adjusted with respect to curtain tension, after first loosening the lock nut 54, by the act of turning the through-shaft 49, which is provided for that purpose with a screw driver slot 49a. When the correct tension has been secured on the coiled spring 48, the lock nut 54 is then tightened and will require no further adjustment.

The second-curtain take-up tension roller 43 is of a similar construction and is free to turn on a shaft 59 within the limits provided by a tension spring (not shown). The shaft 59, which passes through the said second-curtain take-up tension roller 43, has one end anchored to the plate 53 and is locked thereto by a lock nut 60, and the opposite or right hand end of said shaft, viewing Fig. 3, passes through a bushing 61 anchored to the synchronizer mechanism base plate 56, the said shaft being provided at its right hand end with a screw-driver slot 59a used in adjusting the spring tension.

Having thus described in detail the structure of a two-curtain focal-plane shutter as one example of such a type of shutter, reference is now made to Figs. 4 to 7 wherein the synchronizer mechanism is shown, it being evident from a comparison of Fig. 4 with Fig. 1 that the structure represented in Figs. 4 to 7 is that which is shown on a smaller scale in Fig. 1 at the lower left hand corner of the camera casing, the cover 33 of the synchronizer mechanism being shown in place in Fig. 1, but omitted from Fig. 4 for clearness of representation of the underlying parts.

Attached to the first-curtain take-up tension roller 42 is the first shutter-curtain 62, indicated also as No. 1 on Figs. 1 and 4, and attached to the second shutter-curtain take-up tension roller 43 is the second shutter-curtain 63 also there indicated as No. 2. The shutter curtains 62, 63 are attached to the respective rollers 42, 43 in any well known manner as by cementing the shutter curtains to the rollers, this being usual practice.

Meshing with the pinion 52 of the said first-curtain take-up tension roller 42 is a synchronizer timing gear 64 made of Bakelite or any other suitable molding material and provided with a bushing 65 terminating in a plate 66 turning with the said timing gear 64. The said bushing 65 rides on a shoulder stud 67 riveted to the synchronizer mechanism base plate 56, and the said bushing 65, the timing gear 64 and the said plate 66 are held in position by means of a locking washer 68 fitted into a groove in said stud 67 which is provided with a step of enlarged diameter, indicated at 69, and to which is fitted a contact carrying member 70 provided with an insulating block member 71, held to the contact carrying member 70 by rivets 72, 72. The said insulating block member 71 is provided with a contact arm support pin 73 held to the said insulating block member 71 by a locking screw 74 and pivoted to the support pin 73 is a contact arm 75.

The synchronizer timing gear 64 is provided with a circular groove of modified V-formation indicated at 76, in which travels the contact point 77 of said contact arm 75. Located at a suitable point in the said groove 76 is a contact member 78 herein shown in Fig. 4 as composed of a loop of wire extending into holes in the said synchronizer timing gear 64 and through holes in the plate 66, as indicated in Fig. 7, so as to form a contact and current carrying path between said plate 66 and the contact point 77.

To the upper right hand corner of the synchronizer mechanism base plate 56, viewing Fig. 4, is attached a contact plate 79, insulated from the said plate 56 by insulating block 80 and held to the said camera wall 20b by screws 81, 81, Fig. 4. The said insulating block 80 provides for a path for the electrical current to the contact member 75 through the screw 74 and the pin 73, and the circuit is provided through the said insulating block 80 by wire 82, Fig. 4, connected to said block by a screw 83. The opposite end of the wire 82 is connected to a terminal contact strip 84 by a screw 85, said strip terminating at contact member 86 carried by an insulating member 87 attached to an extension of the synchronizer mechanism base plate 56 by screws 88, 88, Fig. 4. A second contact member 89 is also fitted into the contact insulating member 87 and is electrically connected to the synchronizer mechanism base plate 56.

The said contact members 86 and 89 are provided with threaded portions 86a, 89a, and the insulating block 87 is supplied with threaded openings into which the contact members 86 and 89 are threaded, and fitted over which is a second insulating member 90 held in place by a tubular member 91 attached to the mechanism housing or cover 33.

When the mechanism is in use an electrical attaching plug fits into the opening of the said tubular member 91 and has suitable openings to receive the said contact members 86, 89. Since such attaching electrical plug is of well known construction, it need not be more particularly referred to nor shown.

Attached to the synchronizer mechanism housing or cover 33 is an adjusting plate or disk-like member 92 represented in Figs. 5 and 6 and shown in greater detail in Fig. 9, it being attached to the synchronizer mechanism housing or cover 33 by means of a tubular rivet 93 provided with a suitable shoulder to allow the adjusting member 92 to pivot in the said housing or cover 33 which for that purpose has a suitable hole provided therefor. The said housing or cover 33 is also, as shown in Fig. 1, provided with an elongated arcuate opening 94 through which passes the clamping screw 36. The said adjusting plate or member 92, as most clearly shown in Fig. 9, is of a circular disk-like formation and has extending in its plane and from the edge thereof a prolongation or arm 96 having two right angled projections 97, 98 that engage the insulating block 71 when the synchronizer mechanism housing or cover 33 is in place, as shown in Fig. 4.

In order to adjust the position of the contact 77, the adjusting screw 36 is loosened and is then moved in either a clockwise or contraclockwise direction until the proper position is determined, the screw 36 being then tightened and the mechanism remains in such described adjustment. As the said adjusting screw 36 is moved in a clockwise or a contraclockwise direction, the adjusting plate or member 92 is also moved carrying with it the right angled projections 97, 98, by which the contact block 71 and the contact carrying member 70 will be moved in a like direction. Therefore, the contact arm 75 will also be moved, thus changing the position of the contact point 77 in the groove 76 of the synchronizer timing gear 64. The screw 74 which travels with the insulating block 71 will travel either to the left or to the right of the central position thereof, shown in Fig. 4, but will maintain contact with the spring contact plate 79.

When the two curtains 62, 63 are wound up on the shutter rewind rollers 37, 40 ready for making an exposure, the slot or aperture provided by the edge of the first curtain will be beyond the exposure opening in the sensitized material holder of the camera in a vertical direction, the synchronizer timing gear 64 meshing, as stated, with the pinion 52 so as to bring the contact 78 into the position shown in Fig. 4, this being the initial adjustment.

Inasmuch as the position of the exposure slot or aperture as provided by the edge of the first curtain 62 will vary in different cameras, and in different types of shutters, it is necessary to provide an adjustment for the contact arm 75, as in some instances the contact point 78 and the contact point 77 will electrically engage almost as soon as the shutter curtain is released. At other times the electrical engagement between the contact point 78 and the contact point 77 will not occur until the leading edge of the shutter curtain slot or aperture as constituted by the two curtains has traveled all the way across the said exposure opening. By my invention I have provided sufficient adjustment to take care of all these conditions.

It is desirable at times to use flashlamps having a relatively long ignition delay, as, for example, twenty milliseconds, and having a long duration of flash, and when such a lamp is used it is desirable to have illumination during the entire travel of the shutter exposure slot or aperture all the way across the exposure opening. The adjustment of the contact arm 75 will be approximately that represented in Fig. 4, but it is to be understood that this will vary somewhat with different shutters, though with the particular shutter herein shown the adjustment indicated is correct.

With reference to the use of the newer flash lamps, such as the type SM manufactured by the General Electric Company, having an ignition delay of five milliseconds and a duration of flash of fifty milliseconds (1/200 of a second), when using such a flashlamp the duration of the flash is not sufficiently long to allow the shutter to travel all the way across the exposure opening, and in such case it is desirable to have the flash take place when the entire exposure slot or aperture is in alignment with the exposure opening or when the first curtain 62 reaches a full open condition, the second curtain 63 having been set for a full aperture.

To time properly for this condition the contact arm 75 must be moved in a right hand direction viewing Fig. 4, so as to cause contact to take place when the leading edge of the first curtain, constituting the leading edge of the exposure slot or aperture, is seventy-five per cent of the way across the exposure opening of the camera, or, in other words, just before the leading edge of the said exposure slot or aperture, as provided by curtain 62, reaches the full open condition.

When the two-curtain shutter is set for an exposure the curtains 62 and 63 will be wound up on the shutter rewind rollers 37, 40. The said two-curtain shutter is released by pressure on the shutter release lever 30, whereupon the first curtain 62 will immediately start to travel in a downward direction viewing Fig. 4, and will be wound up on the first-curtain take-up tension roller 42, turning the pinion 52 in a contraclockwise direction and turning the synchronizer timing gear 64 in a clockwise direction and carrying with it the contact point 78. When the exposure slot or opening formed by the two curtains 62, 63 reaches a correct position with regard to the said exposure opening of the camera, and in accordance with the adjustment of the contact arm 75, electrical contact will take place between the contact points 78 and 77, thus completing the circuit to the flashlamp.

An electrical battery 99, represented in the diagram Fig. 8, is connected to one contact 86 of the plug-receiving means 35 by a wire 100, and one side of a photoflash lamp 101 is connected to the contact 89 by a wire 102. The second contact of the lamp 101 is connected to the other side of the battery by a wire 103, shown in Fig. 8. The contact point 77 of the contact arm 75 is connected to the terminal connector 86 in any suitable manner, preferably as follows:

The contact arm 75 makes contact with the pivot pin 73, screw 74, contact plate 79, screw 83, wire 82, screw 85 and connector strip 84. The contact point 78 makes contact with the terminal contact 89 through the plate 66, the bushing 65, the pin 67 and the plate 56. When the contact point 78 reaches the contact point 77 an electrical circuit is established through the battery 99 and the flashlamp 101, causing a flash to take place a very brief space of time thereafter depending upon the characteristics of the fuse used in a flashlamp. By means of the described adjustment, it is possible, by the act of turning the insulating block 71 to the right or to the left as described, very accurately to vary the time of contact in completing the electrical circuit through the flashlamp.

It will be understood from the foregoing description and explanation that I have provided a full range of adjustments by which the contact may be caused to take place a considerable time before the exposure opening, as provided by the edge of the first curtain 62 and the cooperating edge of the second curtain 63, reaches the exposure opening of the sensitized material holder of the camera, or I can by suitably positioning said adjusting means cause an electrical contact to take place when the leading edge of the exposure slot or aperture, as provided by the first curtain 62, has reached the furthermost edge of the exposure opening in the said sensitized material holder of the camera. Thus I provide a complete range of adjustment for firing or flashing all of the now known types of flashlamps, and it is also possible and quite practicable to use the herein disclosed synchronizer mechanism for synchronizing with the new gaseous discharge lamp such as the Kodatron. When adjusting for exposure the said latter type of lamp, contact should take place at the exact time that the leading edge of the exposure slot or opening as provided by the first curtain 62 reaches the full open position, inasmuch as there is no measurable time delay between contact and time of flash with the type of lamp termed the Kodatron. It will be evident from the foregoing disclosure that by the conjoint action of varying the size of the exposure slot or aperture of the two-curtain shutter, and of adjusting the relative positions of the said two contacts, I vary the instant of the occurrence of substantially the peak of the flash of the flashlamp with respect to the position that the final edge of the first curtain has with relation to the exposure opening of the sensitized material holder of the camera. Thus, by the conjoint result of said two adjustments I cause electrical contact to occur either as early as substantially when the shutter curtain is released, or during the entire travel of the exposure aperture across the exposure opening of the camera, or at such time that the flesh takes place when the entire exposure aperture is in alignment with the exposure opening of the camera.

It will be evident from the foregoing disclosure and the explanation thereof that I have herein provided synchronizer mechanism for use with focal-plane shutters of the two-curtain type that can be attached to any existing shutter of the two-curtain type without in any way changing the shutter mechanism and by making merely a slight change in one of the take-up tension rollers thereof. It is a well established fact, as first set forth in my Patent No. 2,304,035, that a shutter curtain will always be rewound on the take-up tension roller thereof in exactly the same manner regardless of the number of times of operation, and thus after once adjusting the contact timing the adjustments will remain fixed. As set forth in said patent, if, on the contrary, a synchronizer be connected up to a shutter-curtain rewind roller, the curtain is found to have a different starting position for each successive exposure due to so-called packing, thus causing a change in the timing of the circuit to the photoflash lamp.

I have herein provided a two-curtain shutter having a variable aperture and having operatively connected the synchronizer mechanism with one of the curtain take-up tension rollers, desirably the first curtain take-up tension roller.

The synchronizer mechanism herein disclosed is one the adjustment whereof can be changed very quickly so as to accommodate the synchronization to any and all flashlamps now available.

So far as I am aware, I am the first to provide means to synchronize a Kodatron lamp or any other gaseous discharge lamp or indeed any flashlamp with a focal plane shutter of the two-curtain type.

The construction herein disclosed is particularly adapted to shutters larger than the miniature type, but may also be used on shutters using curtains of other types by modifying such shutters to provide for a larger initial run of the curtain.

Having thus described one illustrative embodiment of the invention, it is to be understood that although specific terms are employed, they are used in a generic and descriptive sense and not for purposes of limitation, the scope of the invention being set forth in the following claims.

I claim:

1. Means for effecting synchronization of the flash of a photoflash lamp with the shutter action of a two-curtain shutter itself having means providing a variable exposure slot or aperture, such means including the following parts: a camera having a photoflash lamp; an electric circuit applied to said camera and including said lamp and also including contacts for closing said circuit in effecting synchronization; a shutter comprising two separate, adjacent, sliding curtains each provided with its own shutter-curtain rewind roller and its own take-up tension roller; such shutter having means for varying the effective size of the single-exposure opening provided by said two curtains; and means for controlling such synchronization from the take-up tension roller of one of said curtains and including adjusting means to vary the exact instant for completing the circuit and the flashing of the photoflash lamp with relation to the instant the shutter composed of said two curtains is open, so that the conjoint result of said adjustments is to cause the electrical contact to occur at such time that, when using a flashlamp with a very short ignition time, such flashlamp is ignited very briefly (i. e., substantially five milliseconds) before the sensitized-material aperture of the camera is entirely uncovered, whereby synchronization of such a flashlamp having substantially a five millisecond ignition time is effected, in making an instantaneous exposure, when using an aperture provided by the said two curtains that is of a width equal to that of the picture-taking aperture of the sensitized-material holder of the camera, as contrasted with synchronization effected during a time exposure when using a multiple-aperture, single, focal-plane curtain.

2. Means for effecting synchronization of the flash of a photoflash lamp with the shutter action of a two-curtain shutter itself having means providing a variable exposure slot or aperture, and wherein said shutter includes two separate, adjacent curtains both adjacent the focal plane of the camera, which curtains have shutter-curtain rewind roller means and take-up tension roller means; such means for effecting synchronization including a photoflash lamp in operative relation to said camera and also including an electric circuit applied to the camera, said circuit including said photoflash lamp and also including two contacts for the closing of said circuit in effecting such synchronization, such means for effecting synchronization also including means for controlling such synchronization from the take-up tension roller of one of said curtains, said means for controlling the synchronization from such take-up tension roller itself including a contact gear in meshing relation with said take-up tension roller carrying one contact only, and which contact is one of said two contacts for closing the circuit in effecting synchronization, and means for adjusting the relative positions of said two contacts so as by the conjoint action of varying the size of the exposure slot or aperture of the curtain and of adjusting the relative position of said contacts, thereby varying the instant of the occurrence of substantially the peak of the flash of the flashlamp with respect to the position that the final edge of the first curtain has with relation to the exposure opening of the sensitized material holder of the camera, so as by the conjoint result of said two adjustments to cause the electrical contact to occur either as early as substantially when the shutter curtain is released, or to occur during the entire travel of the shutter exposure aperture across the exposure opening of the camera, or to occur at such time that the flash takes place when the entire exposure aperture is in alignment with the exposure opening of the camera.

OSCAR STEINER.